US007301652B2

(12) United States Patent
Yu

(10) Patent No.: US 7,301,652 B2
(45) Date of Patent: Nov. 27, 2007

(54) QUICK REFERENCE TO PRINTER SETTING INFORMATION

(75) Inventor: Zhongming Yu, Redwood City, CA (US)

(73) Assignee: Ricoh Company, Ltd., Tokyo (JP)

( * ) Notice: Subject to any disclaimer, the term of this patent is extended or adjusted under 35 U.S.C. 154(b) by 848 days.

(21) Appl. No.: 10/139,277

(22) Filed: May 7, 2002

(65) Prior Publication Data

US 2005/0248809 A1    Nov. 10, 2005

(51) Int. Cl.
*G06F 15/00* (2006.01)
*G06F 3/12* (2006.01)

(52) U.S. Cl. .................................... 358/1.13; 358/1.12
(58) Field of Classification Search ............ None
See application file for complete search history.

(56) References Cited

U.S. PATENT DOCUMENTS

| | | | | | |
|---|---|---|---|---|---|
| 4,811,111 | A | * | 3/1989 | Kurokawa | 358/440 |
| 4,893,333 | A | * | 1/1990 | Baran et al. | 379/100.11 |
| 5,227,893 | A | * | 7/1993 | Ett | 358/400 |
| 5,267,303 | A | * | 11/1993 | Johnson et al. | 379/100.07 |
| 5,465,167 | A | * | 11/1995 | Cooper et al. | 358/468 |
| 5,513,013 | A | * | 4/1996 | Kuo | 358/448 |
| 5,764,738 | A | * | 6/1998 | Gillon et al. | 379/100.11 |
| 5,777,754 | A | * | 7/1998 | Gavan | 358/407 |
| 6,396,594 | B1 | * | 5/2002 | French et al. | 358/1.18 |
| 6,646,765 | B1 | * | 11/2003 | Barker et al. | 358/474 |
| 6,762,771 | B1 | * | 7/2004 | Niki et al. | 715/700 |
| 6,765,688 | B1 | * | 7/2004 | Claiborne | 358/1.18 |
| 6,883,140 | B1 | * | 4/2005 | Acker et al. | 715/730 |
| 6,924,826 | B1 | * | 8/2005 | Nakagiri et al. | 715/700 |
| 6,940,614 | B2 | * | 9/2005 | Subramaniam | 358/1.13 |
| 7,027,179 | B2 | * | 4/2006 | Mori | 358/1.18 |
| 7,057,749 | B2 | * | 6/2006 | Ozaki | 358/1.13 |

* cited by examiner

*Primary Examiner*—Gabriel Garcia
(74) *Attorney, Agent, or Firm*—Oblon, Spivak, McClelland, Maier & Neustadt, P.C.

(57) ABSTRACT

A novel method of printing including receiving printer setting information indicative of printer driver settings corresponding to a print request, and printing the printer driver settings along with a print job corresponding to the print request. Further, the printer driver settings may be printed only on a first page of the print request, on all pages of the print request, on a separate front sheet of the print request, and/or on a separate rear sheet of the print request. The printer setting information is further indicative of computer system information including, for example, a computer user name, a name of computer software used to make a file corresponding to the print request, a name of the file, a name of a printer printing the print request, and a printing time stamp. This computer system information may also be printed together with the printer driving settings. In addition, the printer driver settings include, for example, a printer paper source, an output paper tray, a layout setting, a collation status, a duplex setting, an orientation setting, a paper size, a scale rate, a positive or negative image, an original or mirror image, font information, watermark information, coloring information, and a print job waiting time and job queue schedule information. The present invention also relates to a printer and graphical user interface allowing a user to print the printer setting information on desired pages.

57 Claims, 10 Drawing Sheets

56

Printer & PS version: (RICOH Aficio AP4510 PS3) (3011.103) 2
Scale: 100% Negative image: 0 Hard disk: 0 Input slot: 0 Output bin: 0
Portrait No-Collate 1-up Simplex No-Staple No-Punch
RiStaple command sniper: /Staple 0(default)
Applicaiton - file name: Microsoft Word - 2p.doc
User Name: zmyu  TIME STAMP: 07/16/2001 08:52
* * * * Front Separation Page * * * *

Figure 9

Page 1

58

Printer & PS version: (RICOH Aficio AP4510 PS3) (3011 103) 2
Scale: 100% Negative image: 0 Hard disk: 0 Input slot: 0 Output bin: 0
Portrait No-Collate 1-up Simplex No-Staple No-Punch
RIStaple command sniper. /Staple 0(default)
Applicaiton - file name Microsoft Word - 2p.doc
User Name: zmyu TIME STAMP: 07/16/2001 08:52
Quick reference to the Settings of a Printing Job Watermark

Figure 10

Page 2

The end page

Pri........sion. (RICOH Aficio AP4510 PS3) (3011.10...
Sc........egative image. 0 Hard disk: 0 Input slot. 0 ...
Po........llate 1-up Simplex No-Staple No-Punch
Ri........and sniper: /Staple 0(default)
Ap........name: Microsoft Word - 2p.doc
Use........u TIME STAMP: 07/16/2001 08:52
Quic........the Settings of a Printing Job Waterma...

zmyu
C:\dsm\2p.doc

Printer & PS version: (RICOH Aficio AP4510 PS3) (3011.103) 2
Scale: 100% Negative image: 0 Hard disk: 0 Input slot: 0 Output bin: 0
Portrait No-Collate 1-up Simplex No-Staple No-Punch
RIStaple command sniper: /Staple 0(default)
Applicaiton - file name: Microsoft Word - 2p.doc
User Name: zmyu   TIME STAMP: 07/16/2001 08:52
\* \* \* \* \* Back Separation Page \* \* \* \* \*

QUICK REFERENCE TO PRINTER SETTING INFORMATION

BACKGROUND OF THE INVENTION

1. Field of the Invention

The present invention relates to a printer and method thereof which receives printer setting information indicative of printer driver settings corresponding to a print request, and prints the printer driving settings along with a print job corresponding to the print request.

2. Discussion of the Background

Currently, image forming apparatus such as a printer connected to a computer provide the user with many different printing features and printer configurations. For example, using a printer's properties pop-up window, a user may select a variety of printer driver settings including a printer paper source, an output paper tray, a layout setting, a collation status, a duplex setting, an orientation setting, a paper size, a scale rate, a positive or negative imaging format, font information, watermark information, coloring information, etc. After the user selects the OK push button on the printer's property pop-up window, a printer driving existing on the computer prints the print job according to the selected features.

In more detail, FIG. 1 illustrates a conventional set-up of a computer 52 and a printer 56 attached via a connection of cable, local network or Internet 54. The printer 56 includes a connection port 57 for attaching the connection of cable, local network or Internet 54 to the printer 56. Thus, a user using the computer 52 can select an item or other object to be printed on the printer 56.

FIG. 2 illustrates a block diagram of a conventional application 60 interfacing the printer 56. The conventional application 60 is hosted on an operating system 64 resident on the computer 52. When the user invokes a print command from the application 60, the document or other item to be printed is communicated to a printer driver 62. The printer driver 62 is a printer and operating system specific software interface. The operating system 64 sends signals in accordance with instructions from the printer driver 62 to the printer port and/or network card 68 via a connection 66, thus placing signals corresponding to the document or other item to be printed on the cable and/or other network 54 connected to the printer 56.

Thus, a user using the computer 52 may select a variety of different features as discussed above and the print driver 62 prints the requested print job on the printer 56 according to the selected features. In some cases, a separate front or rear sheet may be printed along with the requested print job indicating computer system information such as a name of the file and a printing time stamp, for example. However, after the printer driver 62 queues the requested print job, all of the vital printer driver settings are lost. That is, the printer driver 62 does not store this information nor print this information along with the print job.

Therefore, it is not possible for the user to view the previously set printing driver settings, which may be useful if the user forgot which tray he/she printed to, for example. Further, the printer setting information including the computer system information and the printer driver settings are important for document management, publication duplication, proof printing, pre-press (i.e., the preparation of camera-ready materials for mass industrial printing), printer software QA, printer software development, etc.

Currently, users have to actually compile the printer setting information into the document, or alternatively write down the printer setting information. Obviously, this is extremely inefficient and time consuming.

SUMMARY OF THE INVENTION

Accordingly, one object of the present invention is to solve the above-noted and other problems.

Another object of the present invention is to provide a quick reference to the selected printer setting information so as to automatically retrieve the computer system information and the printer driver settings and either display these values or print them along with the printed document.

To achieve these and other objects, the present invention provides a novel method of printing including receiving printer setting information indicative of printer driver settings corresponding to a print request, and printing the printer driver settings along with a print job corresponding to the print request. Further, the printer driver settings may be printed only on a first page of the print request, on all pages of the print request, on a separate front sheet of the print request, and/or on a separate rear sheet of the print request. The printer setting information is further indicative of computer system information including, for example, a computer user name, a name of computer software used to make a file corresponding to the print request, a name of the file, a name of a printer printing the print request, and a printing time stamp. This computer system information may also be printed together with the printer driver settings. In addition, the printer driver settings include, for example, a printer paper source, an output paper tray, a layout setting, a collation status, a duplex setting, an orientation setting, a paper size, a scale rate, a positive or negative image, an original or mirror image, font information, watermark information, coloring information, and a print job waiting time and job queue schedule information. The present invention also relates to a printer and graphical user interface allowing a user to print the printer setting information on desired pages.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 illustrates a watermark printed on a separate front sheet including the selected printer driver settings;

FIG. 10 illustrates a watermark printed on the first page of the original test file shown in FIG. 8 including the selected printer driver settings;

FIG. 11 illustrates a watermark printed on the second page of the original test file shown in FIG. 8 including the selected printer driver settings; and FIG. 12 illustrates a watermark printed on separate rear sheet including the selected printer driver settings.

DESCRIPTION OF THE PREFERRED EMBODIMENTS

Figure 1:
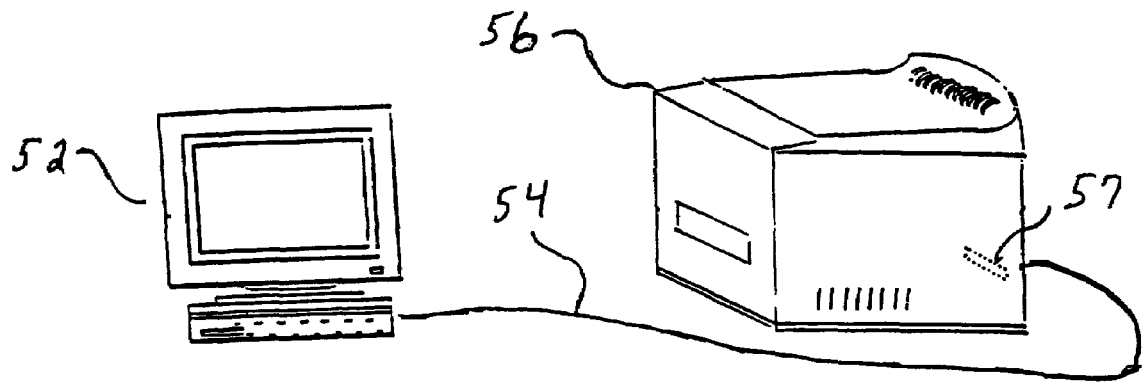
FIG. 1 is an overview illustrating a conventional computer connected to a printer.
Figure 2:
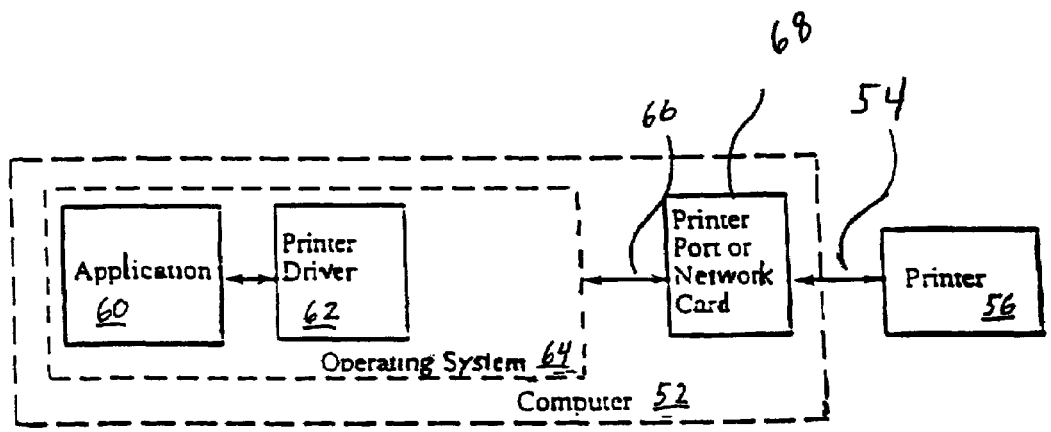
FIG. 2 is a block diagram illustrating functional components and data passed between a software application and a printer.

Referring now to the drawings, wherein like reference numerals designate identical or corresponding parts throughout the several views, the present invention will be described.

Figure 3:
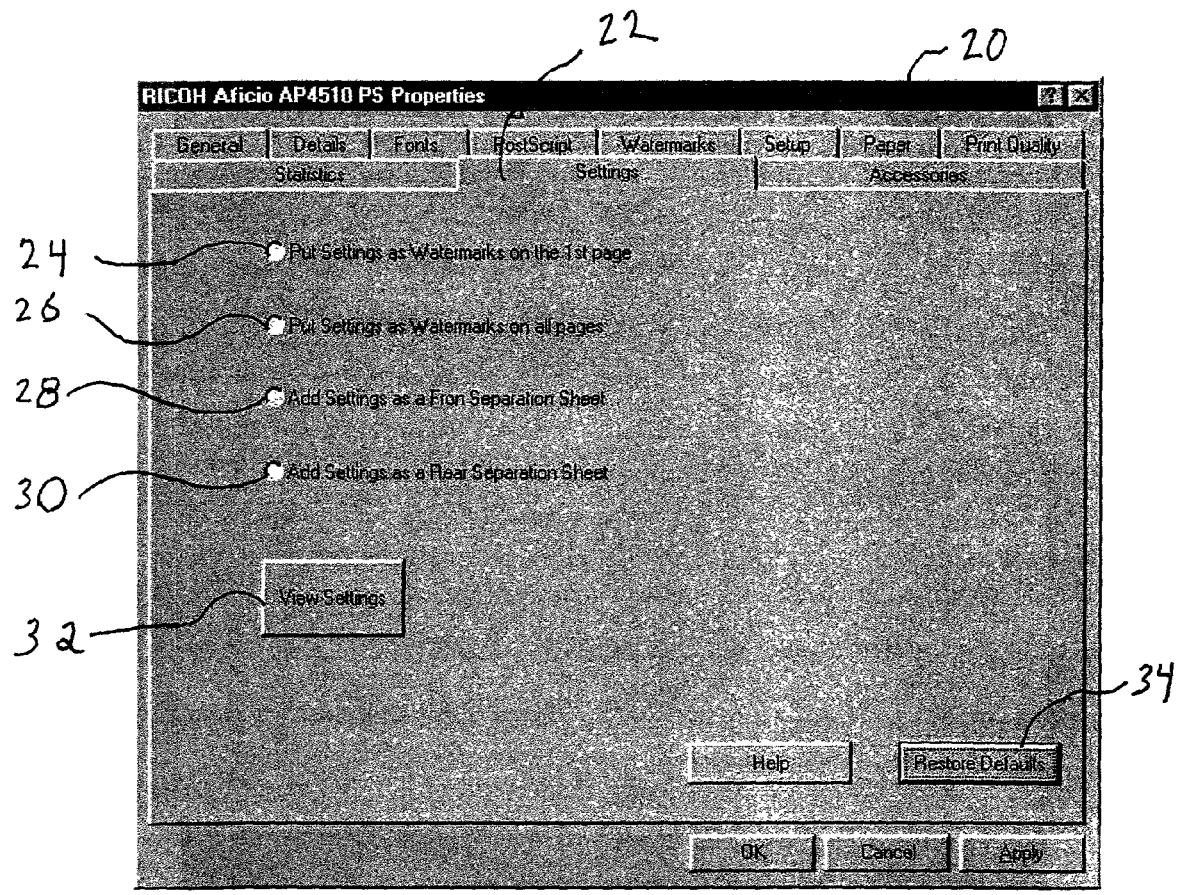
FIG. 3 is a graphical user interface illustrating a settings tab of a printer's properties pop-up window.

Turning first to FIG. 3, which is a graphical user interface illustrating a settings tab according to the present invention. In more detail, to enable a user to specify a particular fashion in which the printer driver settings are printed along with the print request, a settings tab is included with the printer driver. That is, each printer driver includes a printer properties pop-up window providing the user with a variety of features which may be selected. For example, a user may select a particular font, postscript, watermark, paper tray, type of paper, etc. using the printer properties dialog 20. According to the present invention, the printer properties dialog 20 also includes the settings tab 22.

The settings tab 22 includes four different radio buttons (i.e., options 24, 26, 28 and 30). For example, the radio button 24 may be selected to print the printer setting information 25 as watermark on a first page, the radio button 26 may be selected to print the printer setting information as a watermark on all pages of the print request, the radio button 28 may be selected to print the printer setting information on a separate front sheet of the print request, and the radio button 30 may be selected to print the printer setting information on a separate rear sheet of the print request.

Figure 4:
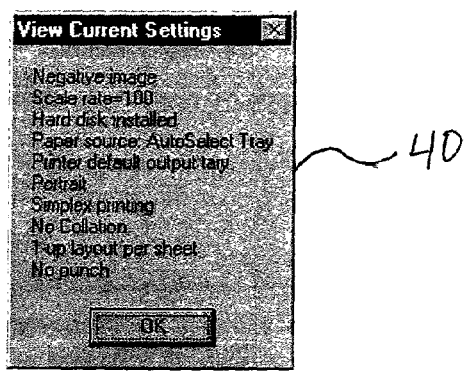
FIG. 4 is a pop-up window illustrating currently selected printer driving settings.

The user may also select any combination of the radio buttons 24, 26, 28 and 30, except the user may not select both radio buttons 24 and 26 (i.e., it is not possible to print the printer setting information only on the first page and on all pages). The user may also view the printer setting information on a display by selecting the View Settings push button 32. For example, as shown in FIG. 4, a pop-up window 40 displays all of the selected printer driver settings.

The user may also restore the default printer driver settings by selecting the restore default push button 34 (i.e., the default settings that are preset by the printer manufacturer or the user as the standard settings). The printer properties dialog 20 also includes the known push buttons OK, Cancel, Apply and Help.

All necessary computer system information and printer driver settings may be captured in a watermark form with the driver source code. For example, a watermarks form called SettingsWatermarkForm may be defined with parameters including text position coordinates SDx0 and Sdy0, graylevel Sdgray, settingsWatermarkLabel, etc. Please note Appendix A illustrates a core code (i.e., a main source code portion to implement the present invention) from a working prototype of a Post Script printer driver for a Ricoh Adonis-P3 printer using Windows 95/98/Me. The core code was developed by the present inventor and the watermarks form definition and invocation is self-documented within the code. Appendix A illustrates such a core code.

Figure 5:
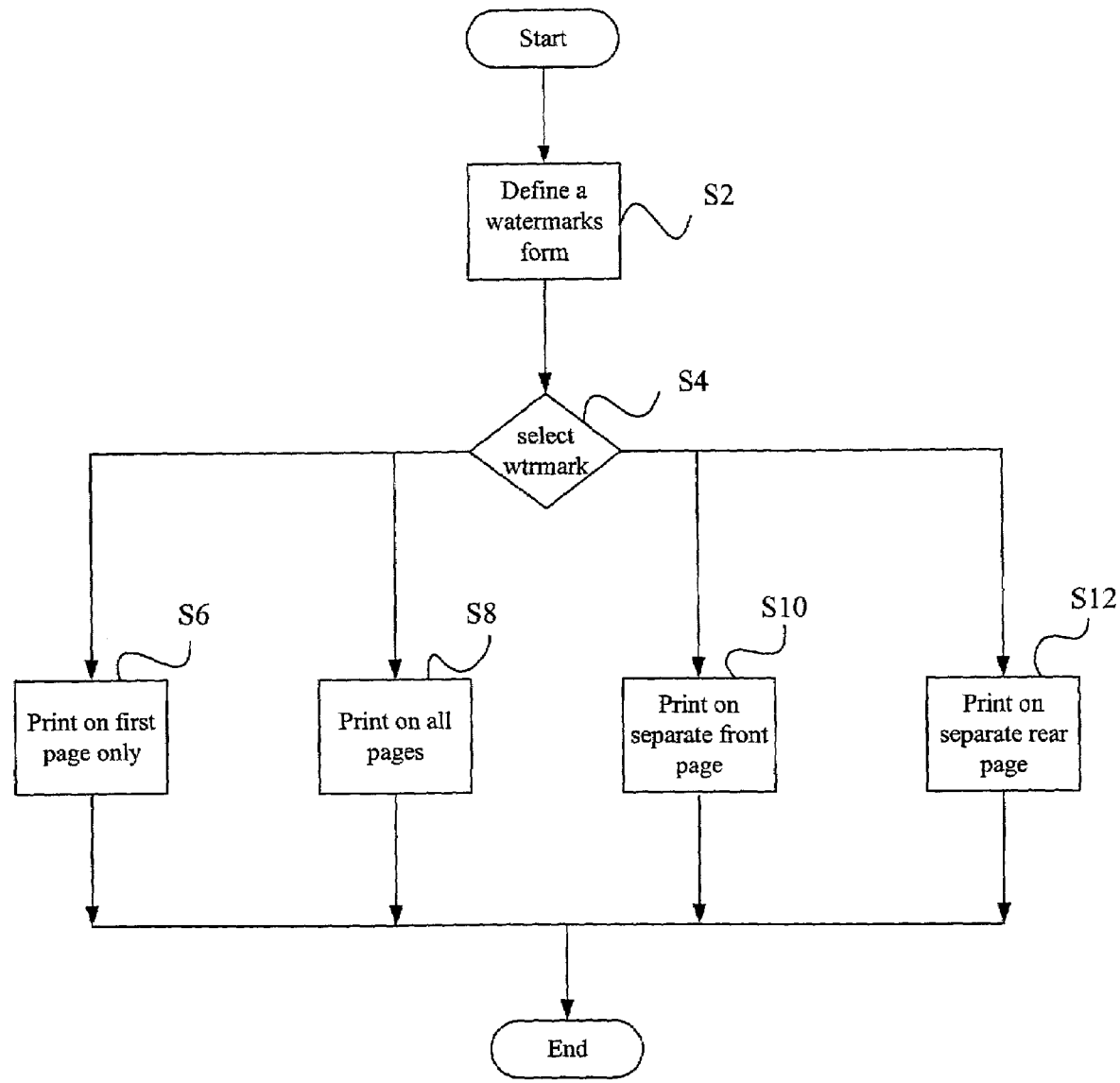
FIG. 5 is a flow chart illustrating a methodology of the present invention.

Turning now to FIG. 5, which illustrates a methodology of the present invention. In step S2, the watermarks form including the different printer setting information is defined and is included within the driver source code. Thus, when a user selects one of the radio buttons 24, 26, 28 and 30 (see FIG. 3), the variables defined in the watermarks form are retrieved and it is determined which of the radio buttons 24, 26, 28 and 30 the user has selected (step S4). Note if the user selects the View Settings push button 32, the selected printer driver settings are automatically displayed on the computer monitor for verification purposes (as shown in FIG. 4, for example).

If the user selects the radio button 24, the printer settings are retrieved and a printer driver command is executed to print the printer settings only on the first page (step S6). Similarly, if the user selects the radio button 26, the proper printer driver command is executed to print the watermark including the printer settings on all pages (step S8). Steps S10 and S12 operate in a similar fashion, in which the watermark is printed on a separate front page (step S10) or on a separate rear page (step S12). Note, as discussed above, it is possible the user can select multiple combinations of the radio buttons 24, 26, 28 and 30 (except for selecting the radio buttons 24 and 26 together). In this instance, all of the proper printer driver commands are executed to perform the selected printing features.

Figure 6:
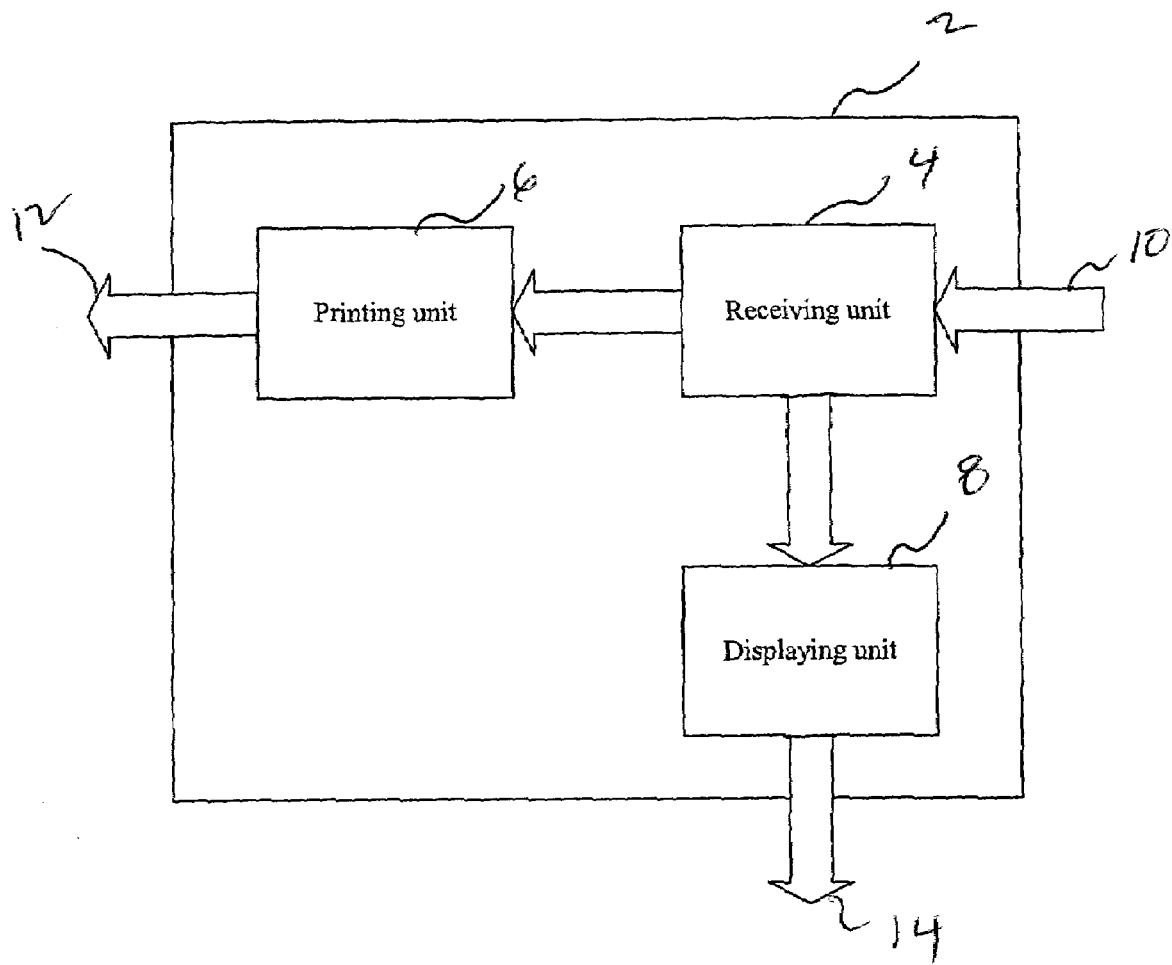
FIG. 6 is a block diagram illustrating additional modules included in a printer driver according to the present invention.

Turning now to FIG. 6, which illustrates a block diagram of additional modules 2 included in a standard printer driver to perform the method of the present invention. For example, the additional modules 2 include a printing unit 6, a receiving unit 4 and a displaying unit 8. The receiving unit 4 may be a software module, for example, which is configured to retrieve the printer setting information indicative of printer driver settings corresponding to a print request as well as the corresponding computer system information. That is, the receiving unit retrieves the printer settings defined in the watermark. The receiving unit 4 may retrieve the printer setting information from an existing data structure in the printer driver, for example.

The printing unit 6 may also be a software module which executes the proper printer driver commands so the watermark is printed on the select page(s). The display unit 8 may also be a software module which displays the information retrieved by the receiving unit 4 when the user selects the View Settings push button 32.

Figure 7:
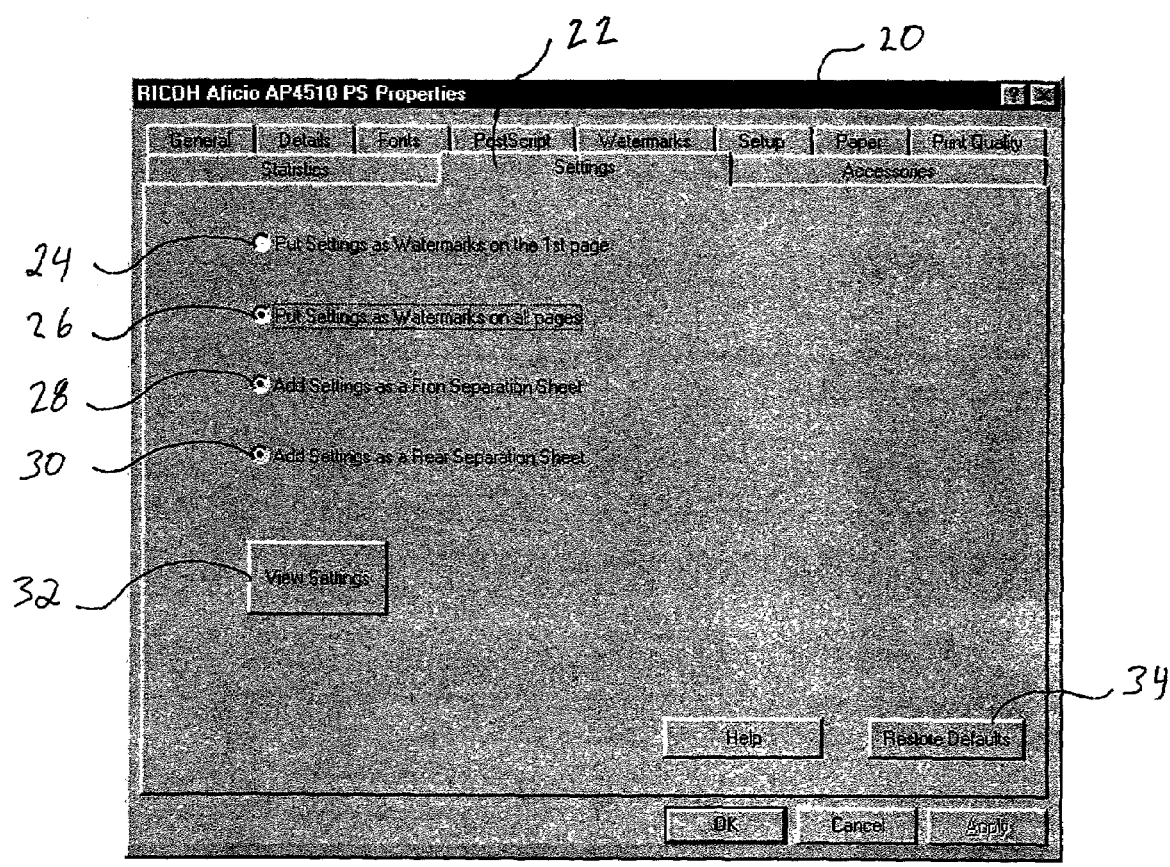
FIG. 7 is a graphical user interface illustrating the settings tab of the printer's properties pop-up window with selected values.
Figure 8:
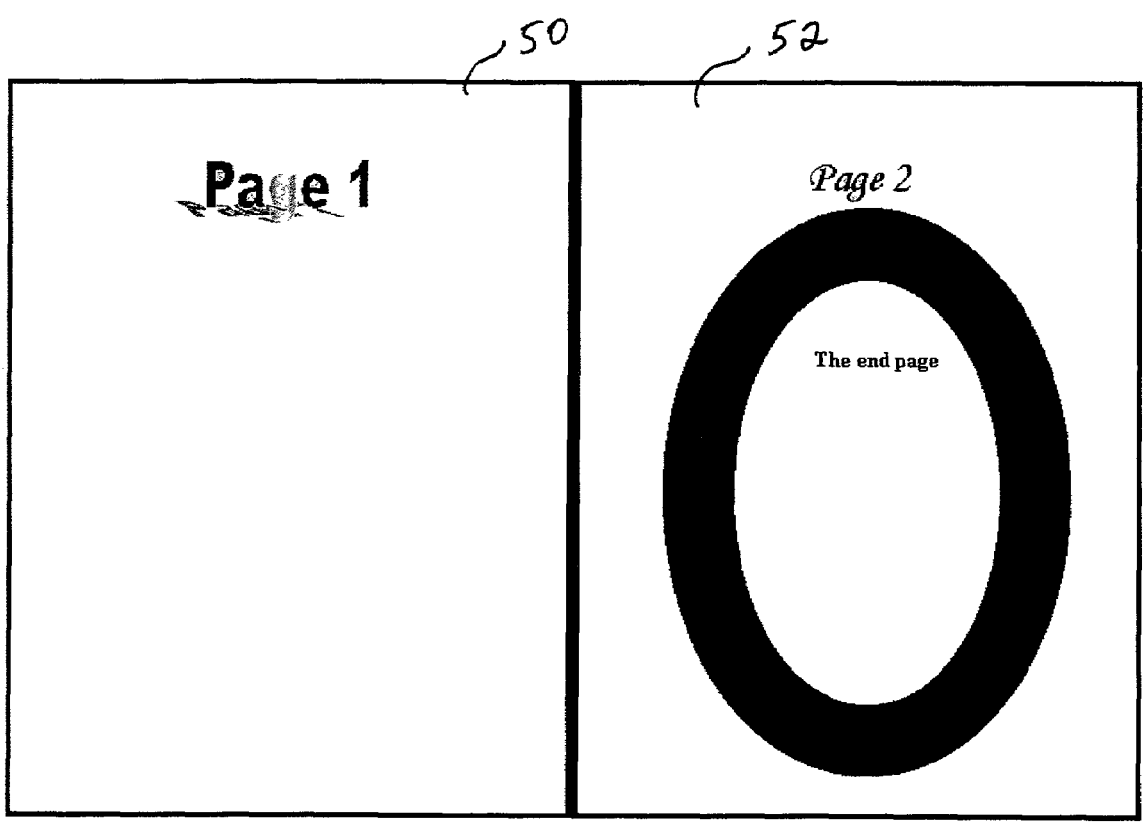
FIG. 8 illustrates an original printed test file.

Turning now to FIG. 7, which illustrates an example of selecting different watermark settings according to the present invention. As shown in FIG. 7, the radio buttons 26, 28 and 30 have been selected (i.e., the user wants to print watermark settings on all pages, as well as on a separate front sheet and separate rear sheet). For example, FIG. 8 illustrates a test document to be printed which includes page 1 and page 2. As shown, page 1 merely includes a label "Page 1" and page 2 includes a label "Page 2" as well as a large capital letter "O" and the phrase "The end page."

FIG. 9 illustrates the printer setting information including the printer driver settings and the computer system information (such as the user name and time stamp) printed on a separate front page, and corresponds to selection of the radio button 28. FIGS. 10 and 11 correspond to the selection of the radio button 26 requesting the watermarks be printed on all pages of the document (i.e., the first and second pages). Similarly, FIG. 12 corresponds to the selection of the radio button 30 requesting the watermark be printed on a separate rear sheet.

Thus, according to the present invention, the user may easily print relevant printer setting information along with the printer document to alleviate the problems discussed in the Background of the Invention.

In addition, the computer system information includes at least one of a computer user name, a name of computer software used to make a file corresponding to the print request, a name of the file, a name of the printer printing the print request and a printing time stamp. Further, the printer driver settings include at least one of a printer paper source, an output paper tray, a layout setting, a collation status, a duplex setting, an orientation setting, a paper size, a scale rate, a positive or negative image, an original or mirror image, font information, watermark information, coloring information, and a print job waiting time and job queue schedule information, for example.

Further, it is noted the printing method according to the present invention may be implemented using known programming languages such as C/C++. In addition, the graphical user interfaces may also be developed using known software modules such as X windows. That is, the method according to the present invention may be made by developing an executable program included with the standard printer driver. For example, the enclosed appendix A illustrates a core code developed by the present inventor for defining and implementation of the watermarks including the printer system information to be printed with the document and for executing the necessary printer driver commands.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits whereby interconnecting an appropriate network of conventional computer circuits, as will be readily apparent to those skilled in the art.

Any portion of the present invention implemented on a general purpose digital computer or microprocessor includes a computer program product which is a storage medium including instructions which can be used to program a computer to perform a process of the invention. The storage medium can include, but is not limited to, any type of disk including floppy disk, optical disk, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

APPENDIX A

A core code from the working prototype of PostScript printer driver for Ricoh's Adonis-P3 printer on Windows 95/98/Me are listed below.

The watermarks form definition and invocation is self-documented within the code.

```
///////////////////////////////////////////////////////////////
/// Define Watermark form with parameter SDgray, SDx0 and SDy0      /
/// denote gray level, coordination of the watermarks form original point /
///////////////////////////////////////////////////////////////
#define x_y_translate(x, y) \
{\
    lstrcat(lpOEMData->lpOEMPostScript, x);\
    lstrcat(lpOEMData->lpOEMPostScript, " ");\
    lstrcat(lpOEMData->lpOEMPostScript, WM_X);\
    lstrcat(lpOEMData->lpOEMPostScript, " add ");\
    lstrcat(lpOEMData->lpOEMPostScript, y);\
    lstrcat(lpOEMData->lpOEMPostScript, " ");\
    lstrcat(lpOEMData->lpOEMPostScript, WM_Y);\
    lstrcat(lpOEMData->lpOEMPostScript, " add ");\
    lstrcat(lpOEMData->lpOEMPostScript, " moveto ");\
}
case PS_INDEX_END_PROLOG:
if(logicalPageCount++ == 0)
{
    lstrcpy(lpOEMData->lpOEMPostScript, "userdict begin \n");
    lstrcat(lpOEMData->lpOEMPostScript, "/SettingsWatermarkForm <<\n");
    lstrcat(lpOEMData->lpOEMPostScript, " /FormType 1\n");
    lstrcat(lpOEMData->lpOEMPostScript, " /BBox [0 0 6000 10000]\n");
    lstrcat(lpOEMData->lpOEMPostScript, " /Matrix [1 0 0 1 0 0]\n");
    lstrcat(lpOEMData->lpOEMPostScript, " /PaintProc{\n");
    lstrcat(lpOEMData->lpOEMPostScript, " /Helvetica findfont\n");
    lstrcat(lpOEMData->lpOEMPostScript, " [120.0 0.0 0.0-120.0 0.0 0.0] makefont setfont\n");//120=font size
        x_y_translate("SDx0", "SDy0")
    lstrcat(lpOEMData->lpOEMPostScript, "(Printer & PS version: ");
    lstrcat(lpOEMData->lpOEMPostScript, printerProductName);
    lstrcat(lpOEMData->lpOEMPostScript, ")show\n");
    x_y_translate("SDx0", "SDy0 200 add")
    lstrcat(lpOEMData->lpOEMPostScript, " (");
    lstrcat(lpOEMData->lpOEMPostScript, "Scale: ");
    sprintf(sTemp,"%d",iScale);
    lstrcat(lpOEMData->lpOEMPostScript, sTemp);
    lstrcat(lpOEMData->lpOEMPostScript, "%");
```

-continued

```
lstrcat(lpOEMData->lpOEMPostScript, " Negative image: ");
sprintf(sTemp,"%d",iNegativeImage);
lstrcat(lpOEMData->lpOEMPostScript, sTemp);
lstrcat(lpOEMData->lpOEMPostScript, " Hard disk: ");
sprintf(sTemp,"%d",iHardDiskInstalled);
lstrcat(lpOEMData->lpOEMPostScript, sTemp);
lstrcat(lpOEMData->lpOEMPostScript, " Input slot: ");
sprintf(sTemp,"%d",iInputTray);
lstrcat(lpOEMData->lpOEMPostScript, sTemp);
lstrcat(lpOEMData->lpOEMPostScript, " Output bin: ");
sprintf(sTemp,"%d",iOutputTray);
lstrcat(lpOEMData->lpOEMPostScript, sTemp);
lstrcat(lpOEMData->lpOEMPostScript, ")show\n");
memset(s,'\0',MAX_SNIPER_PS);
lstrcat(s,sOrientationName[(int)(LOWORD(DRVGetDWordStub(lpOEMData,ID_D
M_PAPER_ORIENTATION, FALSE)))]);//Document sticky value
    x_y_translate("SDx0", "SDy0 400 add")
lstrcat(lpOEMData->lpOEMPostScript, " \n");
lstrcat(lpOEMData->lpOEMlPostScript, "(");
lstrcat(lpOEMData->lpOEMPostScript, s);
lstrcat(lpOEMData->lpOEMPostScript, ")show\n");
memset(s,'\0',MAX_SNIPER_PS);
lstrcat(s, sCollate[iCollate]);
lstrcat(lpOEMData->lpOEMPostScript, "80 0 rmoveto\n");
lstrcat(lpOEMData->lpOEMPostScript, "(");
lstrcat(lpOEMData->lpOEMPostScript, s);
lstrcat(lpOEMData->lpOEMPostScript, ")show\n");
memset(s,'\0',MAX_SNIPER_PS);
lstrcat(s, sLayout[iLayout]);
lstrcat(lpOEMData->lpOEMPostScript, "80 0 rmoveto\n");
lstrcat(lpOEMData->lpOEMPostScript, "(");
lstrcat(lpOEMData->lpOEMPostScript, s);
lstrcat(lpOEMData->lpOEMPostScript, ")show\n");
memset(s,'\0',MAX_SNIPER_PS);
lstrcat(s, sDuplex[iDuplex]);
lstrcat(lpOEMData->lpOEMPostScript, "80 0 rmoveto\n");
lstrcat(lpOEMData->lpOEMPostScript, "(");
lstrcat(lpOEMData->lpOEMPostScript, s);
lstrcat(lpOEMData->lpOEMPostScript, ")show\n");
memset(s,'\0',MAX_SNIPER_PS);
lstrcat(s, sStaple[iStaple]);
lstrcat(lpOEMData->lpOEMPostScript, "80 0 rmoveto\n");
lstrcat(lpOEMData->lpOEMPostScript, "(");
lstrcat(lpOEMData->lpOEMPostScript, s);
lstrcat(lpOEMData->lpOEMPostScript, ")show\n");
memset(s,'\0',MAX_SNIPER_PS);
lstrcat(s, sPunch[iPunch]);
lstrcat(lpOEMData->lpOEMPostScript, "80 0 rmoveto\n");
lstrcat(lpOEMData->lpOEMPostScript, "(");
lstrcat(lpOEMData->lpOEMPostScript, s);
lstrcat(lpOEMData->lpOEMPostScript, ")show\n");
sniperPSstring(keywordID, PPD_KW_STAPLE, iStaple, sniperPS)
h = strmatch(sniperPS,0,"/Position");
if (h>=0)
{memset(t,'\0',MAX_SNIPER_PS); strncpy(t,sniperPS+h, 11);} else strcpy(t," /Staple
0(default)\0");
    lstrcpy(sniperPS, PPD_KW_STAPLE);
lstrcat(sniperPS, " command sniper: ");
lstrcat(sniperPS, t);
x_y_translate("SDx0", "SDy0 600 add")
lstrcat(lpOEMData->lpOEMPostScript, " \n");
lstrcat(lpOEMData->lpOEMPostScript, "(");
lstrcat(lpOEMData->lpOEMPostScript, sniperPS);
lstrcat(lpOEMData->lpOEMPostScript, ")show\n");
strcpy(t," /Punch 0(default)\0");
lstrcpy(sniperPS, PPD_KW_PUNCH);
lstrcat(sniperPS, " command sniper: ");
lstrcat(sniperPS, t);
x_y_translate("SDx0", "SDy0 800 add")
lstrcat(lpOEMData->lpOEMPostScript, "\n");
lstrcat(lpOEMData->lpOEMPostScript, "(");
lstrcat(lpOEMData->lpOEMPostScript, sniperPS);
lstrcat(lpOEMData->lpOEMPostScript, ")show\n");
x_y_translate("SDx0", "SDy0 800 add")
lstrcat(lpOEMData->lpOEMPostScript, " \n");
lstrcat(lpOEMData->lpOEMPostScript, "(");
lstrcat(lpOEMData->lpOEMPostScript, "Applicaiton - file name: ");
lstrcat(lpOEMData->lpOEMPostScript, s_lpJobName);
lstrcat(lpOEMData->lpOEMPostScript, ")show\n");
```

-continued

```
//   User Name
    x_y_translate("SDx0", "SDy0 1000 add")
    lstrcat(lpOEMData->lpOEMPostScript, " \n");
    lstrcat(lpOEMData->lpOEMPostScript, "(");
    lstrcat(lpOEMData->lpOEMPostScript, "User Name: ");
    lstrcat(lpOEMData->lpOEMPostScript, userName);
    lstrcat(lpOEMData->lpOEMPostScript, " TIME STAMP: ");
    lstrcat(lpOEMData->lpOEMPostScript, timeStamp);
    lstrcat(lpOEMData->lpOEMPostScript, ")show\n");
    //time stamp:
    x_y_translate("SDx0", "SDy0 1200 add")
    lstrcat(lpOEMData->lpOEMPostScript, "\n");
    ///font_rear_sheet {(message) show} def
    lstrcat(lpOEMData->lpOEMPostScript, "settingsWatermarkLable");
    ///font_rear_sheet {(message) show} def
    lstrcat(lpOEMData->lpOEMPostScript, " show\n");
    //END:
    lstrcat(lpOEMData->lpOEMPostScript, "pop\n");
    lstrcat(lpOEMData->lpOEMPostScript, "} \>\> def end\n");
    /* Pass back the pointer */
    *lplpOEMPS = lpOEMData->lpOEMPostScript;
    *lpOEMPSLen = lstrlen(lpOEMData->lpOEMPostScript);
}
break;
```

The invention claimed is:

1. A method of printing, comprising:
receiving printer setting information indicative of printer driver settings corresponding to a print request; and
printing the printer driver settings along with a print job corresponding to the print request,
said printer driver settings including settings for a printer and an operating system specific software interface.

2. The method of claim 1, wherein the printing step prints the printer driver settings only on a first page of the print request.

3. The method of claim 1, wherein the printing step prints the printer driver settings on all pages of the print request.

4. The method of claim 1, wherein the printing step prints the printer driver settings on a separate front sheet of the print request.

5. The method of claim 1, wherein the printing step prints the printer driver settings on a separate rear sheet of the print request.

6. The method of claim 1, further comprising:
displaying the printer driver settings on a display of a computer.

7. The method of claim 1, wherein the printer setting information is further indicative of computer system information including at least one of 1) a computer user name, 2) a name of computer software used to make a file corresponding to the print request, 3) a name of the file, 4) a name of a printer printing the print request, and 5) a printing time stamp, and
wherein the printing step prints the computer system information together with the printer driving settings.

8. The method of claim 1, wherein the printer driver settings include at least one of 1) a printer paper source, 2) an output paper tray, 3) a layout setting, 4) a collation status, 5) a duplex setting, 6) an orientation setting, 7) a paper size, 8) a scale rate, 9) a positive or negative image, 10) an original or mirror image, 11) font information, 12) watermark information, 13) coloring information, and 14) a print job waiting time and job queue schedule information.

9. The method of claim 1, further comprising:
displaying on a computer display the following printing options:
a) printing the printer driver settings only on a first page of the print request,
b) printing the printer driver settings on all pages of the print request;
c) printing the printer driver settings on a separate front sheet of the print request; and
d) printing the printer driver settings on a separate rear sheet of the print request.

10. The method of claim 9, wherein the displaying step displays the printing option within a printer properties window.

11. The method of claim 9, further comprising:
restoring any selected printing options to a default value.

12. The method of claim 1, wherein the printer driver settings are printed as a watermark on at least one page of the print request.

13. A printer comprising:
a receiving unit configured to receive printer setting information indicative of printer driver settings corresponding to a print request; and
a printing unit configured to print the printer driver settings along with a print job corresponding to the print request,
said printer driver settings including settings for a printer and an operating system specific software interface.

14. The printer of claim 13, wherein the printing unit prints the printer driver settings only on a first page of the print request.

15. The printer of claim 13, wherein the printing unit prints the printer driver settings on all pages of the print request.

16. The printer of claim 13, wherein the printing unit prints the printer driver settings on a separate front sheet of the print request.

17. The printer of claim 13, wherein the printing unit prints the printer driver settings on a separate rear sheet of the print request.

18. The printer of claim 13, further comprising:
a displaying unit configured to display the printer driver settings on a display of a computer.

19. The printer of claim 13, wherein the printer setting information is further indicative of computer system information including at least one of 1) a computer user name, 2) a name of computer software used to make a file corresponding to the print request, 3) a name of the file, 4) a name of a printer printing the print request, and 5) a printing time stamp, and
    wherein the printing unit prints the computer system information together with the printer driving settings.

20. The printer of claim 13, wherein the printer driver settings include at least one of 1) a printer paper source, 2) an output paper tray, 3) a layout setting, 4) a collation status, 5) a duplex setting, 6) an orientation setting, 7) a paper size, 8) a scale rate, 9) a positive or negative image, 10) an original or mirror image, 11) font information, 12) watermark information, 13) coloring information, and 14) a print job waiting time and job queue schedule information.

21. The printer of claim 13, further comprising:
a displaying unit configured to display on a computer display the following printing options:
a) printing the printer driver settings only on a first page of the print request,
b) printing the printer driver settings on all pages of the print request;
c) printing the printer driver settings on a separate front sheet of the print request; and
d) printing the printer driver settings on a separate rear sheet of the print request.

22. The printer of claim 21, wherein the displaying unit displays the printing option within a printer properties window.

23. The printer of claim 21, further comprising:
a restoring unit configured to restore any selected printing options to a default value.

24. The printer of claim 13, wherein the printer driver settings are printed as a watermark on at least one page of the print request.

25. A printing system, comprising:
means for receiving printer setting information indicative of printer driver settings corresponding to a print request; and
means for printing the printer driver settings along with a print job corresponding to the print request,
said printer driver settings including settings for a printer and an operating system specific software interface.

26. The system of claim 25, wherein the printing means prints the printer driver settings only on a first page of the print request.

27. The system of claim 25, wherein the printing means prints the printer driver settings on all pages of the print request.

28. The system of claim 25, wherein the printing means prints the printer driver settings on a separate front sheet of the print request.

29. The system of claim 25, wherein the printing means prints the printer driver settings on a separate rear sheet of the print request.

30. The system of claim 25, further comprising:
means for displaying the printer driver settings on a display of a computer.

31. The system of claim 25, wherein the printer setting information is further indicative of computer system information including at least one of 1) a computer user name, 2) a name of computer software used to make a file corresponding to the print request, 3) a name of the file, 4) a name of a printer printing the print request, and 5) a printing time stamp, and
    wherein the printing means prints the computer system information together with the printer driving settings.

32. The system of claim 25, wherein the printer driver settings include at least one of 1) a printer paper source, 2) an output paper tray, 3) a layout setting, 4) a collation status, 5) a duplex setting, 6) an orientation setting, 7) a paper size, 8) a scale rate, 9) a positive or negative image, 10) an original or mirror image, 11) font information, 12) watermark information, 13) coloring information, and 14) a print job waiting time and job queue schedule information.

33. The system of claim 25, further comprising:
means for displaying on a computer display the following printing options:
a) printing the printer driver settings only on a first page of the print request,
b) printing the printer driver settings on all pages of the print request;
c) printing the printer driver settings on a separate front sheet of the print request; and
d) printing the printer driver settings on a separate rear sheet of the print request.

34. The system of claim 33, wherein the displaying means displays the printing option within a printer properties window.

35. The system of claim 33, further comprising:
means for restoring any selected printing options to a default value.

36. The system of claim 25, wherein the printer driver settings are printed as a watermark on at least one page of the print request.

37. A computer program product including instructions stored on a computer-readable medium for a printer, comprising:
a first computer code configured to receive printer setting information indicative of printer driver settings corresponding to a print request; and
a second computer code configured to print the printer driver settings along with a print job corresponding to the print request,
said printer driver settings including settings for a printer and an operating system specific software interface.

38. The computer program product of claim 37, wherein the second computer code prints the printer driver settings only on a first page of the print request.

39. The computer program product of claim 37, wherein the second computer code prints the printer driver settings on all pages of the print request.

40. The computer program product of claim 37, wherein the second computer code prints the printer driver settings on a separate front sheet of the print request.

41. The computer program product of claim 37, wherein the second computer code prints the printer driver settings on a separate rear sheet of the print request.

42. The computer program product of claim 37, further comprising:
a third computer code configured to display the printer driver settings on a display of a computer.

43. The computer program product of claim 37, wherein the printer setting information is further indicative of computer system information including at least one of 1) a computer user name, 2) a name of computer software used to make a file corresponding to the print request, 3) a name of the file, 4) a name of a printer printing the print request, and 5) a printing time stamp, and
    wherein the second computer code prints the computer system information together with the printer driving settings.

44. The computer program product of claim 37, wherein the printer driver settings include at least one of 1) a printer paper source, 2) an output paper tray, 3) a layout setting, 4) a collation status, 5) a duplex setting, 6) an orientation setting, 7) a paper size, 8) a scale rate, 9) a positive or negative image, 10) an original or mirror image, 11) font information, 12) watermark information, 13) coloring information, and 14) a print job waiting time and job queue schedule information.

45. The computer program product of claim 37, further comprising:
a third computer code configured to display on a computer display the following printing options:
a) printing the printer driver settings only on a first page of the print request,
b) printing the printer driver settings on all pages of the print request;
c) printing the printer driver settings on a separate front sheet of the print request; and
d) printing the printer driver settings on a separate rear sheet of the print request.

46. The computer program product of claim 45, wherein the third computer code displays the printing option within a printer properties window.

47. The computer program product of claim 45, further comprising:
restoring any selected printing options to a default value.

48. The computer program product of claim 37, wherein the printer driver settings are printed as a watermark on at least one page of the print request.

49. A computer program product including instructions stored on a computer-readable medium and configured to cause a computing device to display a graphical user interface, said instructions comprising instructions to cause a computing device to display:
a first parent window including,
a selection display control configured to provide an option to print printer setting information indicative of printer driver settings corresponding to a print request on at least one of 1) only on a first page of the print request, 2) on all pages of the print request, 3) on a separate front sheet of the print request, and 4) on a separate rear sheet of the print request,
said printer driver settings including settings for a printer and an operating system specific software interface.

50. The computer program product of claim 49, wherein the selection display control comprises:
a first display control configured to provide the option to print the printer driver settings only on the first page of the print request,
a second display control configured to provide the option to print the printer driver settings on all pages of the print request,
a third display control configured to provide the option to print the printer driver settings on the separate front sheet of the print request, and
a fourth display control configured to provide the option to print the printer driver settings on the separate rear sheet of the print request.

51. The computer program product of claim 49, wherein the first parent window is included within a printer properties window.

52. The computer program product of claim 49, further compnsing:
a settings display control configured to display the printer driver settings on a display of a computer.

53. The computer program product of claim 49, further compnsing:
a restoring display control configured to restore any selected printing options from the selection display control to a default value.

54. The computer program product of claim 49, further comprising:
an OK display control configured to perform the option selected the selection display control;
a CANCEL display control configured to cancel the option selected by the selection display control and to close the first parent window; and
a HELP display control configured to provide helpful information about the first parent window.

55. The computer program product of claim 49, wherein the printer setting information is further indicative of computer system information including at least one of 1) a computer user name, 2) a name of computer software used to make a file corresponding to the print request, 3) a name of the file, 4) a name of a printer printing the print request, and 5) a printing time stamp, and
wherein the computer system information is printed together with the printer driving settings, when the selection display control is selected and executed.

56. The computer program product of claim 49, wherein the printer driver settings include at least one of 1) a printer paper source, 2) an output paper tray, 3) a layout setting, 4) a collation status, 5) a duplex setting, 6) an orientation setting, 7) a paper size, 8) a scale rate, 9) a positive or negative image, 10) an original or mirror image, 11) font information, 12) watermark information, 13) coloring information, and 14) a print job waiting time and job queue schedule information.

57. The computer program product of claim 49, wherein the printer driver settings are printed as a watermark on at least one page of the print request.

* * * * *